United States Patent [19]

Murata et al.

[11] Patent Number: 4,476,491

[45] Date of Patent: Oct. 9, 1984

[54] GHOST REDUCTION CIRCUIT FOR TELEVISION RECEIVER

[75] Inventors: Toshinori Murata; Tomomitsu Kuroyanagi; Masafumi Kazumi, all of Yokohama, Japan

[73] Assignee: Hitachi, Ltd., Tokyo, Japan

[21] Appl. No.: 406,565

[22] Filed: Aug. 9, 1982

[30] Foreign Application Priority Data

Aug. 11, 1981 [JP] Japan ............................... 56-124672

[51] Int. Cl.³ .......................... H04N 5/21; H04B 3/04
[52] U.S. Cl. .................................... 358/167; 358/905;
333/18; 455/307; 455/306; 375/14
[58] Field of Search ................. 358/167, 905; 455/307,
455/302, 306, 296; 375/14; 333/18; 364/724

[56] References Cited

U.S. PATENT DOCUMENTS

| | | | |
|---|---|---|---|
| 4,127,874 | 11/1978 | Iwasawa et al. | 455/307 |
| 4,233,683 | 11/1980 | McRae | 375/14 |
| 4,264,884 | 4/1981 | Auzet et al. | 333/165 |
| 4,404,600 | 9/1983 | Murakami | 358/167 |

FOREIGN PATENT DOCUMENTS

| | | | |
|---|---|---|---|
| 55566 | 7/1982 | European Pat. Off. | 358/905 |
| 159813 | 12/1979 | Japan . | |
| 159814 | 12/1979 | Japan . | |

*Primary Examiner*—Tommy P. Chin
*Assistant Examiner*—Michael D. Parker
*Attorney, Agent, or Firm*—Antonelli, Terry & Wands

[57] ABSTRACT

A wide-band ghost reduction circuit apparatus for a television receiver comprises a ghost detector, two transversal filters having delay characteristics different from each other, a switch for selecting one of the filters and an automatic gain control circuit responsive to the output of the ghost detector for controlling the filters and the switch. Each of the transversal filters includes tap amplifiers whose gains are controlled by the automatic gain control circuit and having outputs connected, respectively, to tap inputs of delay devices formed of such as a CCD each provided with a tap and included in the associated transversal filter. Output end of one of the transversal filters having a smaller delay is connected to a selected one of the input tap of the other transversal filter through a switch so that input video signal components join together at every input terminal or every individual tap position of the delay devices.

16 Claims, 8 Drawing Figures

FIG. 1
PRIOR ART

FIG. 2 PRIOR ART
FEEDBACK TRANSVERSAL FILTER

FIG. 3 PRIOR ART
FEEDFORWARD TRANSVERSAL FILTER

GHOST REDUCTION CIRCUIT FOR TELEVISION RECEIVER

CROSS-REFERENCES OF THE RELATED APPLICATIONS

This application relates to U.S. patent application Ser. No. 331,280 entitled "Ghost Reduction Circuit Apparatus for a Television Receiver" filed by Tomomitsu Kuroyanagi on Dec. 16, 1981 and assigned to the present assignee.

The present invention relates to a ghost reduction circuit apparatus for a television receiver.

In the television receiver, the phenomenon of ghost is one of the major causes for degradation in the quality of image. Heretofore, various measures have been taken for preventing or reducing the ghost. As one of the approaches, there can be mentioned a system in which waveform conversion means for video signal, i.e. a transversal filter is made use of. For having a better understanding of the present invention, description will first be made of a hitherto known ghost reduction system which resorts to use of a transversal filter for reducing the ghost. Let the television signal sufferring no ghost be represented by $f_o(t)$ as a function of time t. Further, it is assumed for simplicity that the ghost makes appearance with a time delay t equal to $n\tau$ with respect to the television signal $f_o(t)$, where n is a given interger of 1, 2, ... N and $\tau$ represents a constant. Then, a television signal $f(t)$ containing ghost signal component can be given by the following expression:

$$f(t) = f_o(t) + \sum_{n=1}^{N} c_n f_o(t - n\tau)$$

where $c_n$ represents the magnitude of the ghost signal component. Through Fourier transformation $$F(\omega) = \int_{-\infty}^{\infty} f_o(t)e^{-j\omega t}dt$$

we have $$F(\omega) = F_o(\omega)\left(1 + \sum_{n=1}^{N} c_n e^{-j\omega\tau}\right)$$

Figure 1:
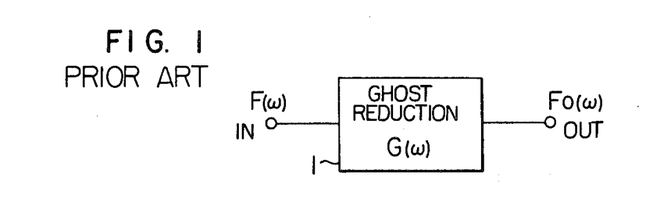
FIG. 1 is a block diagram illustrating a ghost reduction circuit apparatus in principle.

In order to eliminate the ghost component from the television signal including the ghost of the spectrum $F(\omega)$ by supplying it to a ghost reduction circuit 1 having a transfer function $G(\omega)$ for obtaining the television signal $F_o(\omega)$ sufferring from no ghost at the output side of the circuit 1, the following condition must be satisfied.

$$F(\omega) \cdot G(\omega) = F_o(\omega) \quad (1)$$

Accordingly, it is necessary that $$G(\omega) = F_o(\omega)/F(\omega) \quad (2)$$

$$= 1/\left(1 + \sum_{n=1}^{N} c_n e^{-j\omega n\tau}\right)$$

From the above equation, $$G(\omega) + \sum_{n=1}^{N} c_n G(\omega) e^{-j\omega n\tau} = 1$$

Then, Fourier reverse transformation $g(t)$ is obtained as follows:

$$g(t) = \frac{1}{2\pi} \int_{-\infty}^{\infty} G(\omega)e^{j\omega t}d\omega$$

$$g(t - n\tau) = \frac{1}{2\pi} \int_{-\infty}^{\infty} G(\omega)e^{-j\omega n\tau} \cdot e^{j\omega t} \cdot d\omega$$

$$\frac{1}{2\pi}\int_{-\infty}^{\infty} e^{j\omega t}d\omega = \delta(t). \quad \text{(delta function)}$$

Thus, $$g(t) + \sum_{n=1}^{N} c_n g(t - n\tau) = \delta(t)$$

Alternatively, $$g(t) = \delta(t) - \sum_{n=1}^{N} c_n g(t - n\tau)$$

Figure 2:
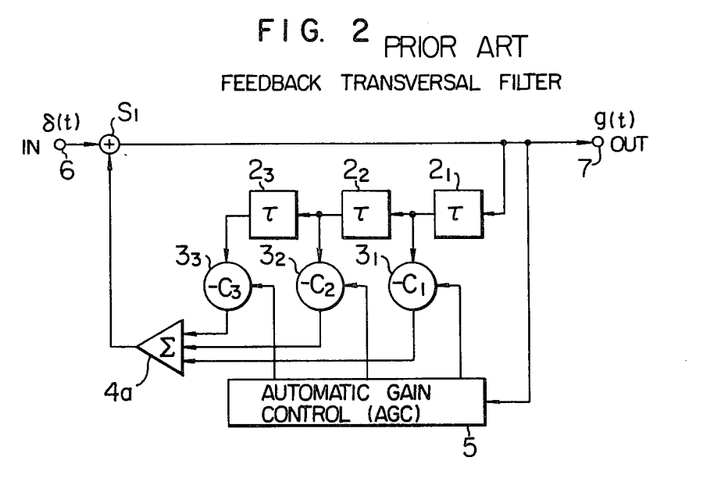
FIGS. 2 and 3 are circuit diagrams showing different types of conventional transversal filters, respectively.

The above expression defines the impulse response of the ghost reduction circuit having the transfer function $G(\omega)$, and thus the hardware to be employed can be realized in conformance with this equation. FIG. 2 shows an arrangement of the ghost reduction circuit implemented on the assumption that N=3. In this figure, reference symbols $2_1$, $2_2$ and $2_3$ denote delay elements connected in cascade and each having a delay time $\tau$, $3_1$, $3_2$ and $3_3$ denote tap amplifiers connected to taps of the cascaded delay elements and having gains $-c_n$ (n=1, 2, 3), respectively, 4a denotes an adder means including adders corresponding in number to the number of inputs minus one, 5 denotes an automatic gain control circuit including a ghost detector and a gain controller for automatically controlling the gains of the amplifiers 3 in dependence on the ghost phenomena as occur, and 6 and 7 denote, respectively, input and output terminals for the video signal. As can be seen, the outputs of the individual delay elements are fed back to the input side through the respective amplifiers and a summer $S_1$. Thus, the illustrated transfer circuit is referred to as the feedback (FB) type transversal filter.

On the other hand, when the ghost is of small magnitude, that is, when $$\left|\sum_{n=1}^{N} c_n e^{-j\omega\tau}\right| << 1,$$

the equation (2) may be rewritten as follows:

$$G(\omega) = 1 - \sum_{n=1}^{N} c_n e^{-j\omega n\tau} \quad (3)$$

Fourier reverse transformation of $G(\omega)$ is then given by $$g(t) = \delta(t) - \sum_{n=1}^{N} c_n \delta(t - n\tau)$$

Figure 3:
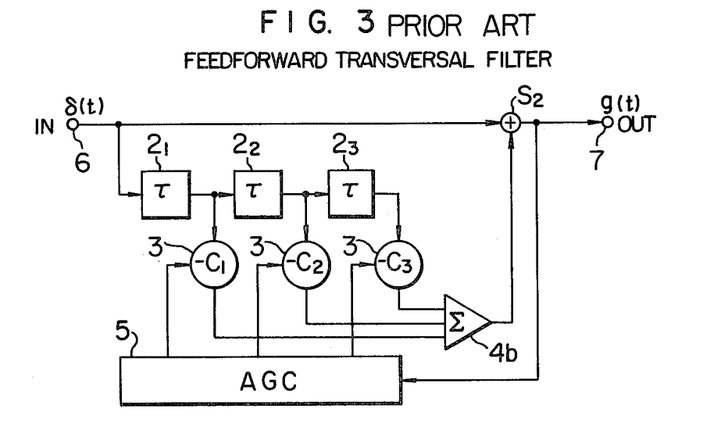

FIG. 3 shows an arrangement of the transfer function circuit realized in conformance with the above equation. All components used in the circuit shown in FIG. 3 are same as those of the FB type transversal filter shown in FIG. 2 and denoted by same symbols. Since no feedback loop is included, this circuit is referred to as the feedforward (FF) type transversal filter to discriminate from the FB type filter shown in FIG. 2. In this connection, it will be noted that the sum output of an adder means $4b$ is fed forward through the summer $S_2$. The adder means $4b$ also includes adders corresponding in number to the number of inputs minus one.

By the way, ghost reduction circuits constituted by the feedforward type transversal filter are known from Japanese Pat. Laid-Open Nos. 159813/1979 and 159814/1979 (Japanese Pat. Applications Nos. 53-69257 and 53-69259 both filed June 8, 1978). Accordingly, any further description concerning the operation of this type circuit will be omitted.

In the case of the feedback (FB) type transversal filter described above, care must be taken for preventing oscillation from taking place. This FB type transversal filter is capable of eliminating substantially the ghost components even of large manitude or high intensity. The feedforward (FF) type transversal filter can also reduce the ghost to a satisfactory degree, when the ghost is of small magnitude (i.e. at low intensity).

It should be here mentioned that the ghosts actually making appearance in the television receiver are of great variety. Needless to say, the ghost may occur at various intensities. As to the number of the discrete ghosts, there may occur a so-called single ghost which is produced singly and a multi-ghost phenomenon in which a plurality of ghosts make appearance. Further, in terms of the delay times, there can be mentioned a so-called short-distance ghost which lies in the vicinity of the real or normal image and a long-distance ghost located relatively far from the real image. Additionally, through combinations of the number and the delay times of the ghosts, there may occur short-distance multi-ghosts, long-distance multi-ghosts, mixtures or combinations thereof and so forth.

In order to reduce these numerous and various ghosts with the aid of the aforementioned transversal filters, the delay time $\tau$ of the individual delay elements 2 should be as short as possible and the number of the delay elements should be increased as large as possible. If the delay time $\tau$ of each of the delay elements is large, it will become impossible to reduce or eliminate the high frequency components of the ghost signal. Further, unless the number of the delay elements is sufficiently large, the long-distance ghost could not be reduced. Under the circumstances, the delay time $\tau$ is usually selected in the order of 0.1 $\mu$sec. In this case, in order to reduce the ghosts which are produced during an interval of 10 $\mu$sec measured from the relevant real or normal image, the number N of the delay elements as required will amount to 100, for 10 $\mu$sec/0.1 $\mu$sec = 100. In other words, a great large number of the delay elements are reuqired. Further, in practical circuit design, the tap amplifiers connected to the taps of the cascaded delay elements and one end of the cascaded connection, respectively, for amplifying the outputs of the associated delay elmenets must be provided in the same number as the delay elements, i.e. 100, which in turn means that the automatic gain control circuit 5 for determining individually the gains of these tap amplifiers must be implemented on a correspondingly enlarged scale. In this way, reduction of the ghosts produced with long delay time by means of the hitherto known transversal filter technique requires necessarily a large scale circuit configuration, involving remarkably increased expensiveness to a great disadvantage.

Figure 4:
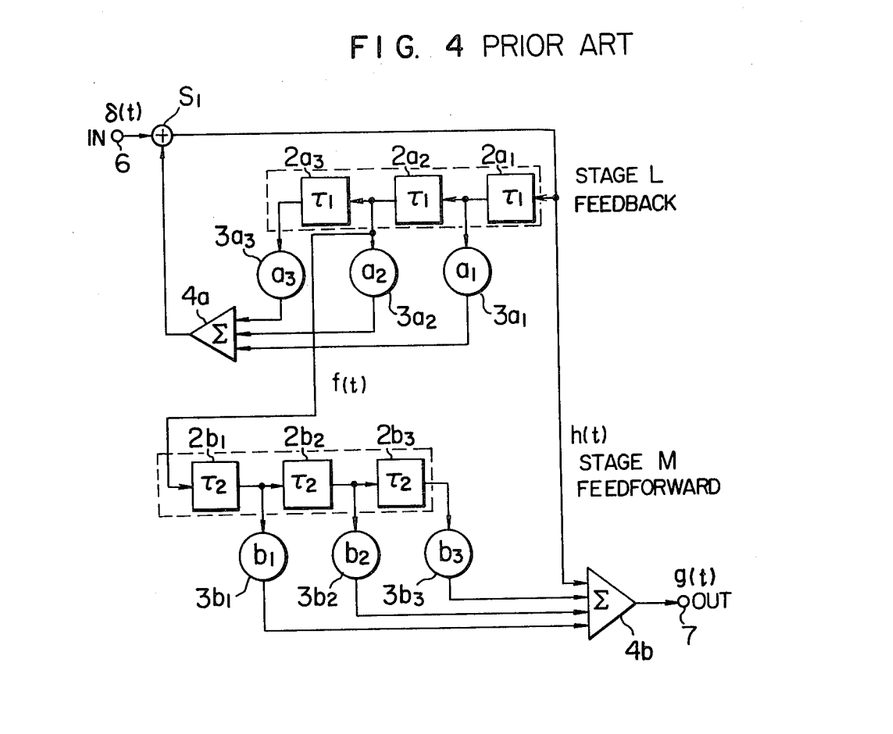
FIG. 4 is a schematic diagram showing a circuit arrangement of a ghost reduction circuit apparatus in which two different type transversal filters are employed.
Figure 5:
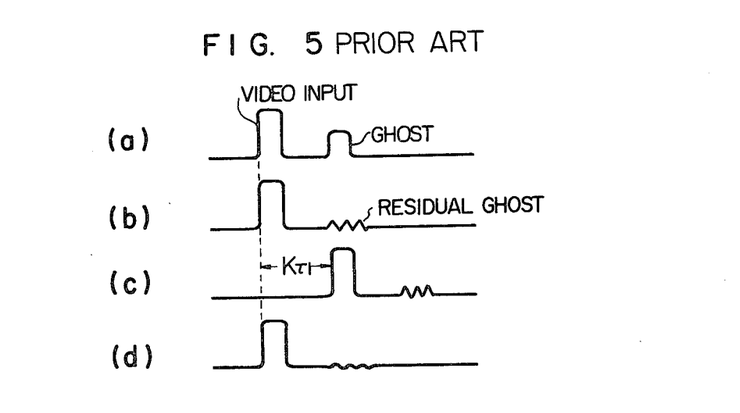
FIG. 5 shows signal waveforms for illustrating the operation of the ghost reduction circuit apparatus shown in FIG. 4.

As one of the measures for solving the above mentioned problem, there has been proposed by one of the inventors of the present application in the above-referred U.S. patent application Ser. No. 331,280 (corresponding to European Pat. Application No. 81305968.0 filed Dec. 18, 1981) a ghost reduction scheme in which the transversal filters of the different types described above are used in combination. Regarding the above scheme, reference is made to FIG. 4 which shows a ghost reduction circuit including transversal filters of different types in two stages together with FIG. 5 showing signal waveforms for illustrating the operation of the above circuit. In FIG. 4, same parts as those shown in FIGS. 2 and 3 are denoted by same reference numerals attached with suffixes a and b. For simplicity of illustration, the automatic gain control circuit is not shown in FIG. 4.

Describing the operation fo the transversal filter circuit shown in FIG. 4, it is assumed that the input terminal 6 for video signal is supplied with a television signal containing ghost signal components as illustrated in FIG. 5 at (a). Immediately after the receiving channel has been changed over, that is, at the initialization for the ghost reducing operation, only the feedback type transversal filter of the first stage L is operated which is constituted by the delay elements $2a_1$, $2a_2$ and $2a_3$, the tap amplifiers $3a_1$, $3a_2$ and $3a_3$ and the adders $4a$ and $S_1$, while the feedforward type transversal filter of the succeeding or second stage M constituted by the delay elements $2b_1$, $2b_2$ and $2b_3$ and the tap amplifiers $3b_1$, $3b_2$ and $3b_3$ remains inoperative. The two sets of delay elements are formed of chargecoupled devices (CCD's), respectively, as indicated by dotted blocks in FIG. 4. The delay time $\tau_1$ of the delay elements $2a_1$, $2a_2$ and $2a_3$ belonging to the first stage L is selected to be, for example, 0.3 $\mu$sec which is longer as compared with the delay time of 0.1 $\mu$sec employed in the hitherto known filter circuit described hereinbefore in conjunction with FIG. 2. Accordingly, only the low frequency components of the input ghost signal are eliminated by the stage L, while high frequency components of the input ghost signal as well as those high frequency components (offspring ghost components) produced in the ghost reducing operation remain unremoved as remnants, as is illustrated in FIG. 5 at (b). Subsequently, the delay time of a region in which a major portion of the residual ghost components is present is determined relative to the real video signal by a circuit included in the aforementioned automatic gain control circuit (not shown in FIG. 4), whereby the output of the delay element corresponding to the determined delay time is automatically selected and inputted to the FF type transversal filter of the second stage M. The signal inputted to the second or succeeding stage M is illustrated in FIG. 5 at (c), in which a symbol $K\tau_1$ means that the output signal from the K-th delay element of the FB type transversal filter of the first stage L (in the case of the illustrated example in FIG. 4, the output from the second delay element selected by the automatic gain control circuit 5) is supplied to the FF type transversal filter of the second stage M which then operates to reduce the remnants (residual ghost component illustrated in FIG. 5 at b) by delaying the signal of the waveform illustrated at (c) in FIG. 5 by the delay time of $n\tau_2$ ($n = 1, 2, \ldots, N$). The delay time $\tau_2$ imparted to each of the delay elements belonging to the second filter stage M is selected in the order of 0.1 μsec. Thus, the residual ghost components inclusive of the high frequency components can be eliminated to a satisfactory level, as is illustrated in FIG. 5 at (d).

Assuming that the number L of the delay elements of the first stage transversal filter is 33 with the delay time $\tau_1$ being 0.3 μsec and that the number M of the delay elements constituting the second stage M is 40 with $\tau_2$ being 0.1 μsec, the ghost making appearance with a time lag not shorter than 10 μsec (i.e., $L\tau_1 + M\tau_2 = 13.9$ μsec) can be processed successfully. Besides, the high frequency components of the ghost which exist in the time duration of $M\tau_2$ (4 μsec) can be made to disappear substantially. In this way, substantially all the ghost signal components can be eliminated.

The scheme shown in FIG. 4 thus allows the ghost components having time lag not shorter than 10 μsec to be successfully suppressed with the number (L+M) of the delay elements (73 delay elements in the case of the illustrated example) which is smaller than the number (say, 100) of the delay elements required in the case of the hitherto known filter shown in FIGS. 2 and 3, to an advantage.

It is an object of the present invention to provide a ghost reduction apparatus whose circuit configuration is significantly simplified through more effective combination of two waveform conversion means.

It is another object of the present invention to provide a ghost reduction apparatus which can be implemented by a decreased number of circuit components and thus facilitated in realization in the form of an integrated circuit.

In view of the above objects, it is taught according to the basic concept of the invention that, in a ghost reduction circuit apparatus which comprises in combination a first transversal filter constituted by a plurality of delay elements connected in cascade and each exhibiting a relatively long delay time and a second transversal filter constituted by a plurality of delay elements connected in cascade and each exhibiting a relatively short delay time, the input of the second transversal filter being supplied with a signal derived by selecting and synthesizing at least one output signal of the delay elements constituting the first transversal filter, circuit arrangement is made such that signal paths to the video signal input terminal and the delay elements are so established that output signals of the delay elements are joined together, so to say, in an input weighting manner. By virtue of this feature, a number of adders for adding together a number of discrete signals can be spared, while the signal level at the output terminal of the filter is protected from being lowered. In particular, the delay elements should preferably be constituted by a CCD.

According to a preferred embodiment of the present invention, there is provided a ghost reduction circuit apparatus which comprises a first transversal filter composed of a plurality of first delay elements connected in cascade between input and output terminals for the video signal and each exhibiting a first delay characteristic and a plurality of amplifiers each connected to each of the first delay elements; a second transversal filter composed of a plurality of second delay elements connected in cascade and each exhibiting a second delay characteristic and a plurality of second amplifiers connected to the second delay elements, respectively; coupling means for selectively coupling one end of the second transversal filter to one of the first delay elements of the first transversal filter; and automatic gain control means for detecting ghsot signal components containined in the video signal and controlling the gains of the first and the second plural amplifiers in such a manner that a major part of the ghost signal components is eliminated by the first transversal filter, while residual ghost signal components are eliminated by the second transversal filter, wherein each of the first and the second amplifeirs has an input connected to receive the video signal (appearing at the video input terminal or the video output terminal) and an output connected to the input terminal of the associated delay element, said coupling means coupling the output terminal of the second transversal filter (i.e. the output terminal of the last element in the cascade connection of the second delay elements) to the input terminal of a selected one of the first cascaded delay elements.

In another preferred embodiment of the present invention, the first transversal filter is realized in the feedback type configuration, while the second transversal filter is of the feedforward type. In consideration of the fact that the residual ghost components will be significant in a region where the ghost signal of large magnitude has existed, the coupling means is adapted to couple the output of the second transversal filter to the output of that of the first amplifiers which is controlled to exhibit the maximum or greatest gain, i.e. the amplifier provided in association with the region where the maximum ghost component has been detected or the amplifier provided in the vicinity of the last-mentioned amplifier.

The coupling means is constituted by a switch which is opened at initiation of the ghost reducing operation. As a result, only the first transversal filter is made operative. After lapse of a predetermined time, the switch is closed and held in the closed state, whereby the second transversal filter is thrown into operation. In response to the closing of the coupling switch, the gains of the first amplifiers are fixed, while the gains of the second amplifiers are controlled. After lapse of a predetermined time, the gains of the second amplifiers are also fixed.

The invention will be more clearly understood by reading the following description of the preferred embodiments of the invention taken in conjunction with the accompanying drawings, in which:

Figure 6:
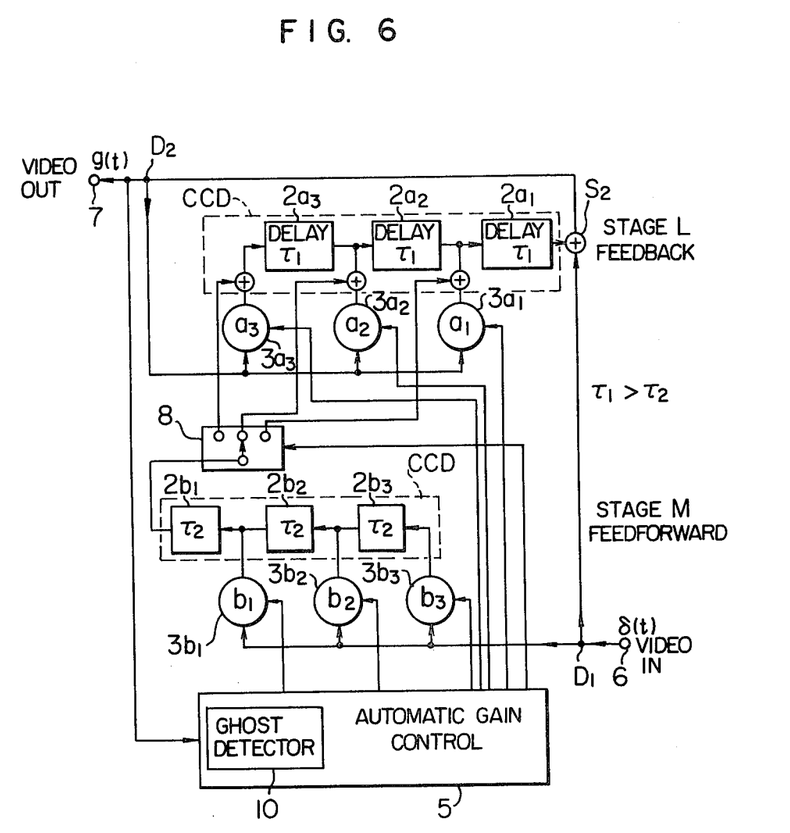
FIG. 6 is a block diagram showing a general arrangement of a ghost reduction circuit apparatus according to an embodiment of the invention.

Referring to FIG. 6 which shows a ghost reduction circuit apparatus according to an embodiment of the invention, a reference numeral 8 denotes a selector switch which may be constituted by an IC device commercially available under trade tradename "CD 4066" from RCA. In this figure, same parts and components as those shown in FIG. 4 are designated by like reference symbols and repeated description of them will be omitted. It will be seen that the circuit arrangement of FIG. 6 differs from FIG. 4 in respect that the input is replaced by the output and vice versa, the adders 4a and 4b are replaced by current dividing junctions $D_1$ and $D_2$ and that the directions in which signals flow are reversed. In this conjunction, the disclosure of the U.S. patent application Ser. No. 331280 is incorpoarated herein for reference.

In the first place, it will be demonstrated that the system shown in FIG. 6 has the same transfer function as that of the system shown in FIG. 4, on the assumption that the number of the delay elements constituting the first or preceding transversal filters is L, while that of the second or succeeding transversal filter is M in both the system (shown in FIGS. 4 and 6).

In the case of the system shown in FIG. 4, the output or impulse response signal g(t) produced upon application of the impulse signal represented by the delta function $\delta(t)$ to the input terminal is expressed by $$g(t) = h(t) + \sum_{n=1}^{M} b_n f(t - n\tau_2)$$

where $b_n$ represents the gain of the n-th amplifier as counted from the input side of the second transversal filter stage. Since $f(t) = h(t - K\tau_1)$, the above equation can be rewritten as follows:

$$g(t) = h(t) + \sum_{n=1}^{M} b_n h(t - K\tau_1 - n\tau_2)$$

Fourier transformation $G(\omega) = F\{g(t)\}$ is obtained as follows:

$$F\left\{ \sum_{n=1}^{M} b_n h(t - K\tau_1 - n\tau_2) \right\} =$$

$$\int_{-\infty}^{\infty} \left\{ \sum_{n=1}^{M} b_n h(t - K\tau_1 - n\tau_2) \right\} e^{-j\omega t} dt =$$

$$\sum_{n=1}^{M} b_n \int_{-\infty}^{\infty} h(t - K\tau_1 - n\tau_2) e^{-j\omega(t - K\tau_1 - n\tau_2)} dt \cdot$$

$$e^{-j\omega(K\tau_1 + n\tau_2)} = \sum_{n=1}^{M} b_n \cdot H(\omega) \cdot e^{-j\omega(K\tau_1 + n\tau_2)} =$$

$$H(\omega) e^{-jK\tau_1\omega} \sum_{n=1}^{M} b_n e^{-jn\tau_2\omega}$$

Then, we have $$G(\omega) = H(\omega) + H(\omega) e^{-jK\tau_1\omega} \sum_{n=1}^{M} b_n e^{-jn\tau_2\omega} \quad (4)$$

When the gain of the m-th amplifier as counted from the input of the first filter stage of the system shown in FIG. 4 is represented by $a_m$, the following equation applies valid as is obvious from the circuit configuration.

$$h(t) = \delta(t) + \sum_{m=1}^{L} a_m h(t - m\tau_1)$$

Through Fourier transformation $$H(\omega) = 1 + H(\omega) \sum_{m=1}^{L} a_m e^{-jm\tau_1\omega}$$

we have $$H(\omega) = \frac{1}{1 - \sum_{m=1}^{L} a_m e^{-jm\tau_1\omega}} \quad (5)$$

By substituting the equation (5) to (4), the transfer function $G(\omega)$ of this system can be determined as follows:

$$G(\omega) = \frac{1 + e^{-jK\tau_1\omega} \sum_{n=1}^{M} b_n e^{-jn\tau_2\omega}}{1 - \sum_{m=1}^{L} a_m e^{-jm\tau_1\omega}} \quad (6)$$

In the case of the system shown in FIG. 6, the output (impulse response) of the system produced upon application of an impulse signal represented by the delta function $\delta(t)$ to the input terminal 6 is given by the following equation:

$$g(t) = \delta(t) + \sum_{m=1}^{L} a_m g(t - m\tau_1) + f(t - K\tau_1)$$

where $a_m$ represents the gain of the m-th amplifier $3a_m$ as counted from the output side of the first stage filter. It is also assumed that the output f(t) of the second stage filter i.e. the output of the last delay element $2b_1$ is applied through the switch 8 to the input terminal of the K-th delay element $2a_k$ (the second delay element in the case of the illustrated embodiment) of the first stage filter as counted from the output side thereof. When the gain of the n-th amplifier of the second stage filter as counted from the output side thereof is represented by $b_n$, $$f(t) = \sum_{n=1}^{M} b_n \delta(t - n\tau_2)$$

where $$g(t) = \delta(t) + \sum_{m=1}^{L} a_m g(t - m\tau_1) + \sum_{n=1}^{M} b_n \delta(t - K\tau_1 - n\tau_2)$$

Through Fourier transformation $$G(\omega) = 1 + G(\omega) \sum_{m=1}^{L} a_m e^{-jm\tau_1\omega} + e^{-jK\tau_1\omega} \sum_{n=1}^{M} b_n e^{-jn\tau_2\omega}$$

we have $$G(\omega) = \frac{1 + e^{-jK\tau_1\omega} \sum_{n=1}^{M} b_n e^{-jn\tau_2\omega}}{1 - \sum_{m=1}^{L} a_m e^{-jm\tau_1\omega}} \quad (7)$$

This coincides with the equation (6).

It is apparent from the foregoing description that the system shown in FIG. 6 exhibits the utterly same transmission characteristic as the system shown in FIG. 4. In the system shown in FIG. 6, the output terminal of each tap amplifier is connected to the output terminal of each delay element so that the output signals of the delay element and the tap amplifier of which output terminals are connected with each other are joined together before being applied to the succeeding delay element. Further, it should be noted that the output of the second stage transversal filter (M) is inputted to one of the delay elements constituting the first or preceding stage transversal filter (L). Thus, in the case of the embodiment illustrated in FIG. 6, the signal-to-noise (S/N) ratio can be protected from being degraded by virtue of the fact that the signals at both input and output terminals of any given delay element are never divided but added together.

In the illustrated embodiment, the first or preceding stage transversal filter L is constituted by the feedback type transversal filter with the second or succeeding stage M being constituted by the feedforward type transversal filter. By virtue of such an arrangement, the ghost signal components of relatively large amplitude contained in the input video signal can be satisfactorily eliminated by the first stage L without producing offspring ghost components. In contrast to the feedforward type transversal filter, the feedback type transversal filter is capable of eliminating the ghost components of the high amplitudes without being accompanied by the off-spring ghost, as described hereinbefore. Of course, the first stage L may also be constituted by the feedforward type transversal filter so far as the amplitude of the ghost signal components contained in the input video signal is relatively small. The feedforward type transversal filter is stable in operation because of its non-oscillation. Although adding means between the delay means and the tap amplifiers are schematically shown, they need not be provided as separate components since an adding function is accomplished by adding of charges in the CCD. Next, the operation of the ghost reduction apparatus shown in FIG. 6 will be described more in detail. Immediately before the initiation of the ghost reducing operation, the switch 8 is in the opened state, and the gains of all the tap amplifiers of both the first and second stage transversal filters L and M are set zero. Upon changing over the channel of the television receiver to a desired one, an operation for the ghost reduction takes place automatically. At that time, the automatic gain control circuit 5 controls the gains of only the tap amplifiers $3a_1, 3a_2, \ldots, 3a_n$ belonging to the first stage transversal filter L immediately following the initiation of the ghost reducing operation, while the gains of the tap amplifiers $3b_1, 3b_2, \ldots, 3b_n$ of the second stage transversal filter M are left uncontrolled. An example of such automatic gain control circuit 5 is disclosed in R. W. LUCKY and RUDIN, "An Automatic Equalizer for General-Purpose Communication Channels" B. S. T. J. 46, 10 (1967-11), pp. 2179-2208.

Figure 7:
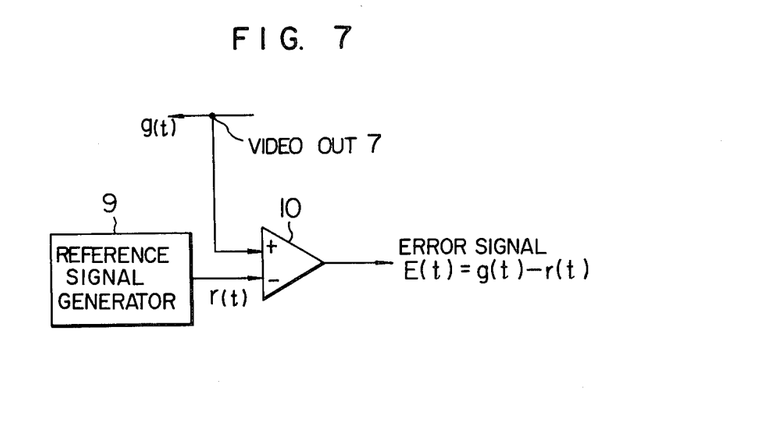
FIG. 7 is a schematic circuit diagram illustrating an arrangement of a ghost detector.

The gain control of the tap amplifiers is effected in a manner mentioned below. The automatic gain control circuit 5 comprises a reference signal generator 9 and a ghost detector 10, as is shown in FIG. 7. The reference signal generator 9 produces a rectangular waveform signal in synchronism with a rise-up edge of a vertical synchronizing signal included in the television signal. The reference signal is derived from the rectangular waveform signal by properly gain-controlling the latter. The rise-up edge of the reference signal is so shaped through a low pass filter that it approximates as closely as possible the rise-up edge of the vertical synchronizing signal. The reference signal r(t) produced by the reference signal generator 9 contains no ghost components at all and is applied to one input of the ghost detector 10 which is constituted by a differential amplifier and has another input supplied with the output signal g(t) appearing at the video signal output terminal 7. This signal g(t) slightly contains residual ghost signal components. Instead of the signal g(t), the input video signal appearing at the input terminal 6 can be applied to the other input of the ghost detector 10, as the case may be. The output E(t) of the ghost detector 10 represents the error or difference between both input signals, i.e. $E(t) = g(t) - r(t)$. The error waveform or output signal E(t) thus represents the ghost component. In this connection, it should be mentioned that, when the video signal produced at the output terminal 7 is used, as it is, as the signal to be compared by the ghost detector 10, it becomes difficult to discriminate the real video signal from the ghost component because of irregularities of the video signal output waveform. Accordingly, it is preferred to derive a synchronizing signal from a vertical blanking signal and compare it with the reference signal r(t) produced as above to detect the ghost component. The output signal of each delay element is generally represented by $X(t - m\tau)$ where $m = 1, 2, \ldots, L$. For algorithm for the automatic gain control, there are known Mean Square Error (MSE), Mean Absolute Error (MAE) and Zero Forcing (ZF). When the value of the gain $a_j$ of the J-th tap amplifier resulted from approximations of l times is represented by $a_j^{(l)}$, the gain $a_j^{(l+1)}$ of the tap amplifier after (l+1) approximations can be determined with the aid of MSE, MAE or ZF algorithm as follows:

$$a_j^{(l+1)} = a_j^{(l)} - \alpha \int_{-\infty}^{\infty} X(t - J\tau)E(t)dt$$

$$a_j^{(l+1)} = a_j^{(l)} - \alpha \int_{-\infty}^{\infty} X(t - J\tau)\text{sgn}E(t)dt$$

$$a_j^{(l+1)} = a_j^{(l)} - \alpha E_j(t)$$

where $$\text{sgn } E(t) = \begin{cases} 1 & \{E(t) > 0\} \\ 0 & \{E(t) = 0\} \\ -1 & \{E(t) < 0\} \end{cases}$$

$$a_j^{(l)} = 0$$

$E_j(t) =$ error magnitude corresponding to the J-th tap

In this connection, reference is to be made to for example, a Japanese literature "Digital Signal Processing" edited by Denshi Tsushin Gakkai (The Institute of Electronics and Communication Engineers of Japan).

The arithmetic operation for the approximation described above is automatically effected by the automatic gain control circuit 5. To this end, the circuit 5 comprises operation units such as multiplier, integrator, subtractor and the like in addition to the aforementioned reference signal generator and the ghost detector (error generator).

The approximating operation mentioned above is repeated after the initiation of the ghost reducing operation for a predetermined number of time which can be determined in consideration of the required accuracy and the time taken for the arithmetic operation. In this way, almost all of the low frequency components of the ghost signal are eliminated, resulting in that only the high frequency components are left. In the case of the ghost reduction system shown in FIG. 6, it must be fulfilled that $\tau_1 > \tau_2$ as is the case of the apparatus shown in FIG. 4. By way of example, $\tau_1 = 0.3$ μsec and $\tau_2 = 0.1$ μsec.

Each of the tap amplifiers is constituted by a voltage-controlled variable gain amplifier known per se. The gains of these tap amplifiers are controlled by the error voltage outputted from the automatic gain control circuit 5 in such a manner that the absolute value of the gain of the tap amplifier (e.g. $a_2$) which is connected to the delay element having a delay time corresponding to the region where the residual high frequency components make appearance at the highest level becomes maximum, while the absolute values of the gains of the tap amplifiers connected to the delay elements having delay times corresponding to the regions where the level or amplitude of the residual ghost components is relatively low are decreased. The tap amplifier whose gain is set maximum or the tap amplifier corresponding to the delay time approximating that of the amplifier of the maximum gain is selected by the switch 8, to thereby connect the output terminal of the selected tap amplifier to the output end of the second or succeeding transversal filter.

Automatic selection of the tap amplifier having the maximum or greatest gain by the switch 8 is effected in a manner mentioned below. As described hereinbefore, the tap amplifiers are controlled by the respective output voltages or error voltages produced by the automatic gain control circuit 5. These error voltages are derived individually from the ghost signal components appearing with different delay times. Accordingly, it is readily possible to select the output signal having the greatest absolute amplitude among those output voltages produced by the automatic gain control circuit 5 with the aid of a voltage comparator circuit to thereby select the tap amplifier having the greatest gain set by the circuit 5, wherein the input of the delay element connected to the selected tap amplifier or the adjacent delay element is automatically connected to the output end of the second or succeeding stage transversal filter by means of the electronic switch 8. Subsequenlty, the switch 8 is fixed at the selected position. Further, the gains of the tap amplifiers of the first or preceding stage are also fixed.

Figure 8:
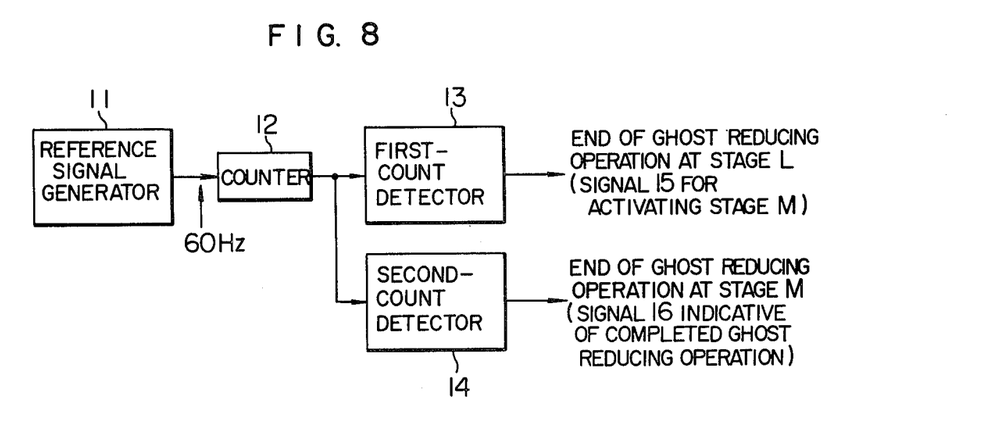
FIG. 8 is a block diagram illustrating an arrangement of a timer circuit used for the ghost eliminating operation.

In this way, when any one contact of the electronic switch 8 is closed, the automatic gain control circuit 5 begins to control the gains of the tap amplifiers belonging to the second stage transversal filter in the utterly same manner as described above. By repeating the above procedure, the ghost components are eliminated. As a result, there can be obtained at the video signal output terminal the video signal free of the ghost components. Upon lapse of a predetermined time after the electronic switch 8 has been closed, the gains of the tap amplifiers of the second stage transversal filter are fixed to prevent an erroneous operation due to noise or the like. A series of the sequential controls triggered at the initiation of the ghost eliminating operation for controlling the operation of the selector switch, fixing of the gains of the tap amplifiers of the first stage transversal filter, gain control and fixing of the tap amplifiers of the second stage filters and so forth in a predetermined timing can be effected under the timing control of a timer circuit shown in FIG. 8. Referring to this figure, the vertical synchronizing signal (60 Hz≈17 m sec) produced by the reference signal generator 11 is counted by a counter 12. First and second count detectors 13 and 14 for detecting predetermined counts of the counter 12 produce ghost reduction terminating signals 15 and 16 for the transversal filters of the first and the second stages L and M. These signals can be utilized for changing over the operation bewteen the first and the second filter stages and detecting the completion of the ghost eliminating operation. The timer circuit shown in FIG. 8 may be activated for 30 sec., for example, after an actuation of channel selection and thereafter inactivated to inhibit the ghsot reducing or eliminating operation, because otherwise noise might be introduced.

According to the teaching of the present invention, the progressive ghost eliminating operation can be effectively and satisfactorily accomplished by virtue of such an arrangement that the detection of the ghost signal component is effected at the video signal output stage, which allows the results of the ghost reduction to be comparatively determined or monitored successively by making use of the periodicity of the television signal, i.e. the vertical synchronizing signal. In other words, the ghost suppression can be constantly monitored even when the ghost components are of great magnitude. Further, by regulating the gains of the individual tap amplifiers bit by bit and determining if the gain regulation is appropriate, a better ghost suppressing effect can be attained.

We claim:
1. A ghost reduction circuit apparatus for a television receiver, comprising:
(a) first waveform conversion means including a plurality of first delay elements connected in cascade with one another between an input terminal and an output terminal of the apparatus for a video signal and each first delay element having a first delay characteristic and a plurality of first amplifiers connected to the input side of said first delay elements, respectively;
(b) second waveform conversion means including a plurality of second delay elements connected in cascade with one another and each second delay element having a second delay characteristic and a plurality of second amplifiers connected to the input side of said second delay elements, respectively;
(c) coupling means for coupling the final end of said second waveform conversion means to one of said first delay elements of said first waveform conversion means;

(d) ghost detecting means for detecting ghost signal components contained in said video signal;

(e) automatic gain control means for controlling the gains of said first and second amplifiers on the basis of the result of the ghost detection effected by said detecting means so that a major portion of said ghost signal components is eliminated by said first waveform conversion means while the residual ghost signal components are eliminated by said second waveform conversion means; and (f) wherein said first and second amplifiers have inputs connected to said output terminal and said input terminal for the video signal, respectively, and having outputs connected to input terminals of the associated delay elements, respectively, said coupling means coupling the output of the final one of said second cascaded delay elements to the input of selected one of said first delay elements under the control of said automatic gain control means.

2. A ghost reduction circuit apparatus according to claim 1, wherein said first waveform conversion means has an input end connected to said video signal output terminal and an output end coupled with one input of an adder whose output is connected to said video signal output terminal, the other input of said adder being coupled with said video signal input terminal.

3. A ghost reduction circuit apparatus according to claim 2, wherein said coupling means is constituted by a switch through which the output end of said second waveform conversion means is coupled to the output side of one of said first amplifiers which is controlled by said automatic gain control means to exhibit the greatest gain.

4. A ghost reduction circuit apparatus according to claim 3, wherein said switch is closed upon elapsing of a predetermined time after initialization for a ghost eliminating operation by said first waveform conversion means, said ghost detecting means and said automatic gain control means and thereafter remains fixed in the closed state.

5. A ghost reduction circuit apparatus according to claim 3, wherein the gains of said first amplifiers are fixed after said switch has been closed.

6. A ghost reduction circuit apparatus according to claim 3, wherein the gains of said second amplifiers are controlled by said automatic gain control means after said switch has been closed.

7. A ghost reduction apparatus according to claim 1 or 2, wherein the gains of said second amplifiers are fixed upon elapsing of a predetermined time after said switch has been closed.

8. A ghost reduction circuit apparatus according to claim 1 or 2, wherein said coupling means is constituted by a switch which is closed upon elapsing of a predetermined time after initialization for a ghost eliminating operation by said first waveform conversion means, said ghost detecting means and said automatic gain control means and thereafter remains fixed in the closed state.

9. A ghost reduction circuit apparatus according to claim 1 or 2, wherein said coupling means is constituted by a switch, the gains of said first amplifiers being fixed after said switch has been closed.

10. A ghost reduction circuit apparatus according to claim 1 or 2, wherein said coupling means is constituted by a switch, the gains of said second amplifiers being controlled by said automatic gain control means after said switch has been closed.

11. A ghost reduction apparatus according to claim 1 or 2, wherein said coupling means is constituted by a switch, the gains of said second amplifiers being fixed upon elapsing of a predetermined time after said switch has been closed.

12. A ghost reduction circuit apparatus according to claim 1, 2 or 3, wherein a delay time of each of said first delay elements is longer than a delay time of each of said second delay elements.

13. A ghost reduction circuit apparatus according to claim 1, 2 or 3, wherein said ghost detection means detects ghost signal components contained in the video signal delivered from said video signal output terminal.

14. A ghost reduction circuit apparatus according to claim 1, 2 or 3, wherein the first delay elements and adders between the first delay elements and the first amplifiers are formed of a charge-coupled device and the second delay elements are formed of another chargecoupled device.

15. A wide band ghost reduction circuit for a television receiver, comprising:

(a) an input terminal and an output terminal for an input video signal;

(b) ghost detecting means connected to said output terminal for detecting ghost signal components contained in said video signal;

(c) first and second transversal filters having delay characteristics differing from each other, said first and second transversal filters being coupled to said output terminal and said input terminal in a feedback connection and a feedforward connection, respectively, each of said transversal filters including a number of cascaded delay elements and tap amplifiers having outputs connected to tap inputs of the delay elements each having a tap and constituting said transversal filters, respectively;

(d) coupling means responsive to a tap selection signal for coupling the output end of said second transversal filter to a selected one of the tap inputs of said first transversal filters; and (e) automatic gain control means responsive to the detection output of said ghost detecting means for controlling said tap amplifiers of said first and second transversal filters and supplying the tap selection signal to said coupling means, in such a manner that a major part of the detected ghost components is reduced by said first transversal filter, while said second transversal filter reduces the residual ghost signal components.

16. A wide-band ghost reduction circuit according to claim 15, wherein the cascaded delay elements of each transversal filter are formed of a charge-coupled device (CCD), the delay time of each delay element of said first transversal filter is longer than that of each delay element of said second transversal filter, and the outputs of said second transversal filter and said tap amplifiers of the first transversal filter being added on the input side of the CCD in the charge conditions and supplied to said tap inputs of the first transversal filter.

* * * * *